(12) United States Patent
Moon et al.

(10) Patent No.: US 11,303,217 B2
(45) Date of Patent: Apr. 12, 2022

(54) ADAPTIVE SR TURN-ON CONTROL IN AN LLC RESONANT CONVERTER

(71) Applicant: SEMICONDUCTOR COMPONENTS INDUSTRIES, LLC, Phoenix, AZ (US)

(72) Inventors: Sangcheol Moon, Bucheon-si (KR); Dongjin Park, Siheung (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 26 days.

(21) Appl. No.: 16/450,116

(22) Filed: Jun. 24, 2019

(65) Prior Publication Data

US 2020/0403519 A1 Dec. 24, 2020

(51) Int. Cl.
*H02M 3/335* (2006.01)
*H02M 1/088* (2006.01)

(52) U.S. Cl.
CPC ....... *H02M 3/33592* (2013.01); *H02M 1/088* (2013.01)

(58) Field of Classification Search
CPC ............. H02M 3/335; H02M 3/33515; H02M 3/33569; H02M 3/33576; H02M 3/33592
See application file for complete search history.

(56) References Cited

U.S. PATENT DOCUMENTS

| | | | |
|---|---|---|---|
| 10,063,159 B1* | 8/2018 | Kong | H03K 5/1252 |
| 2002/0141209 A1* | 10/2002 | Bridge | H02M 3/33592 363/89 |
| 2015/0049522 A1* | 2/2015 | Iorio | H02M 3/33576 363/21.03 |
| 2015/0102793 A1* | 4/2015 | Chen | H02M 3/1588 323/282 |
| 2015/0131336 A1* | 5/2015 | Choi | H02M 3/3353 363/21.02 |
| 2015/0229219 A1* | 8/2015 | Choi | H02M 3/33569 363/21.03 |
| 2017/0317598 A1* | 11/2017 | Ptacek | H02M 3/33523 |

(Continued)

OTHER PUBLICATIONS

"LLC Resonant Converter Synchronous Rectification Design using FAN6248," ON Semiconductor Product Description Publication No. AND9618/D, Jan. 2018—Rev. 2, 11 pages, Copyright Semiconductor Components Industries, LLC.

(Continued)

*Primary Examiner* — Gustavo A Rosario-Benitez
(74) *Attorney, Agent, or Firm* — Dickinson Wright PLLC; Mark E. Scott (57) ABSTRACT

Resonant power converters. Example embodiments are methods of operating a rectification controller including sensing a drain-source voltage of a synchronous rectification (SR) field effect transistor (FET); setting an adaptive delay time corresponding to a time interval between a first state transition and a second state transition, with each of the first and second state transitions corresponding to the drain-source voltage transitioning between being greater than the adaptive delay voltage and being less than the adaptive delay voltage; and driving the SR FET to a conductive state after the drain-source voltage having been less than the on-threshold voltage for longer than the adaptive delay time.

20 Claims, 8 Drawing Sheets

(56) References Cited

U.S. PATENT DOCUMENTS

| | | | |
|---|---|---|---|
| 2018/0034261 A1* | 2/2018 | Lee | H02M 1/32 |
| 2018/0212527 A1* | 7/2018 | Kong | H02M 3/33592 |
| 2018/0287506 A1* | 10/2018 | Gadler | H02M 7/06 |
| 2019/0379293 A1* | 12/2019 | Kannan | H02M 1/08 |
| 2020/0036280 A1* | 1/2020 | Yang | H02M 3/33523 |
| 2021/0175817 A1* | 6/2021 | Miao | H02M 1/08 |
| 2021/0184588 A1* | 6/2021 | Chen | H02M 1/0032 |

OTHER PUBLICATIONS

"Dual Fast Turn-off Intelligent Controller," Monolithic Power Systems Product Description Publication No. MP6922, Jun. 7, 2016—Rev. 1.25, 14 pages, Copyright MPS.

"Secondary Side Synchronous Rectification Driver for High Efficiency SMPS Topologies," ON Semiconductor Product Description Publication No. NCP4306, Dec. 2018—Rev. 5, 56 pages, Copyright Semiconductor Components Industries, LLC.

"Adaptive synchronous rectification controller for LLC resonant converter, SRK2001," STMicroelectronics Product Datasheet No. DS10811—Rev 5, Sep. 2018, 21 pages, Copyright STMicroelectronics.

"GreenChip dual synchronous rectifier controller," NXP Product Data Sheet TEA1995T—Rev 3, Dec. 5, 2017, 18 pages, Copyright NXP.

* cited by examiner

ADAPTIVE SR TURN-ON CONTROL IN AN LLC RESONANT CONVERTER

CROSS-REFERENCE TO RELATED APPLICATIONS

Not Applicable.

BACKGROUND

Resonant power converters utilize a resonant circuit on the primary side of the power converter to create an alternating current (AC) signal applied to a primary winding of a transformer. The AC signal applied to the primary winding is transferred across the transformer to create an AC signal on the secondary winding. In some cases, a rectification controller controls one or more synchronous rectification (SR) field effect transistors (FETs) to rectify the AC signal on the secondary winding to supply a direct current (DC) voltage to a load.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC), a microcontroller (with controlling software), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to resonant power converters for converting a direct current (DC) input voltage $V_{DC}$ from a power source to an output voltage to be supplied to a load. The power source may be a battery or another power supply or converter circuit, such as a power factor correcting (PFC) converter.

More specifically, various example embodiments are directed to resonant power converters with a rectification controller configured to control a synchronous rectification (SR) field effect transistor (FET) using an adaptive delay time before commanding the SR FET to switch on (i.e. to a conductive state) in order to prevent inversion currents in the SR FET, particularly when the resonant power converter is operating in light-load condition in which a secondary voltage on a transformer is below an output voltage of the resonant power converter.

Various example embodiments are directed to rectification controllers that implement an adaptive delay time for turning on SR FET in a resonant power converter. More particularly, in example embodiments, an integrated circuit rectification controller defines a gate terminal, and a drain sense terminal having a drain-source voltage. The integrated circuit rectification controller includes a turn-on controller including a drain sense input coupled to the drain sense terminal and an on-delay output coupled to the gate terminal, with the turn-on controller configured to energize the on-delay output in response to the drain-source voltage being less than an on-threshold voltage for an adaptive delay time. The turn-on controller includes an adaptive delay comparator defining a comparator output. The adaptive delay comparator is configured to assert the comparator output in response to the drain-source voltage being less than an adaptive delay voltage and to de-assert the comparator output in response to the drain-source voltage being greater than the adaptive delay voltage. The adaptive delay time is set based on a time between a first state transition of the comparator output of the adaptive delay comparator and a second state transition of the comparator output of the adaptive delay comparator. The specification now describes a resonant power converter to an example orient the reader.

Figure 1:
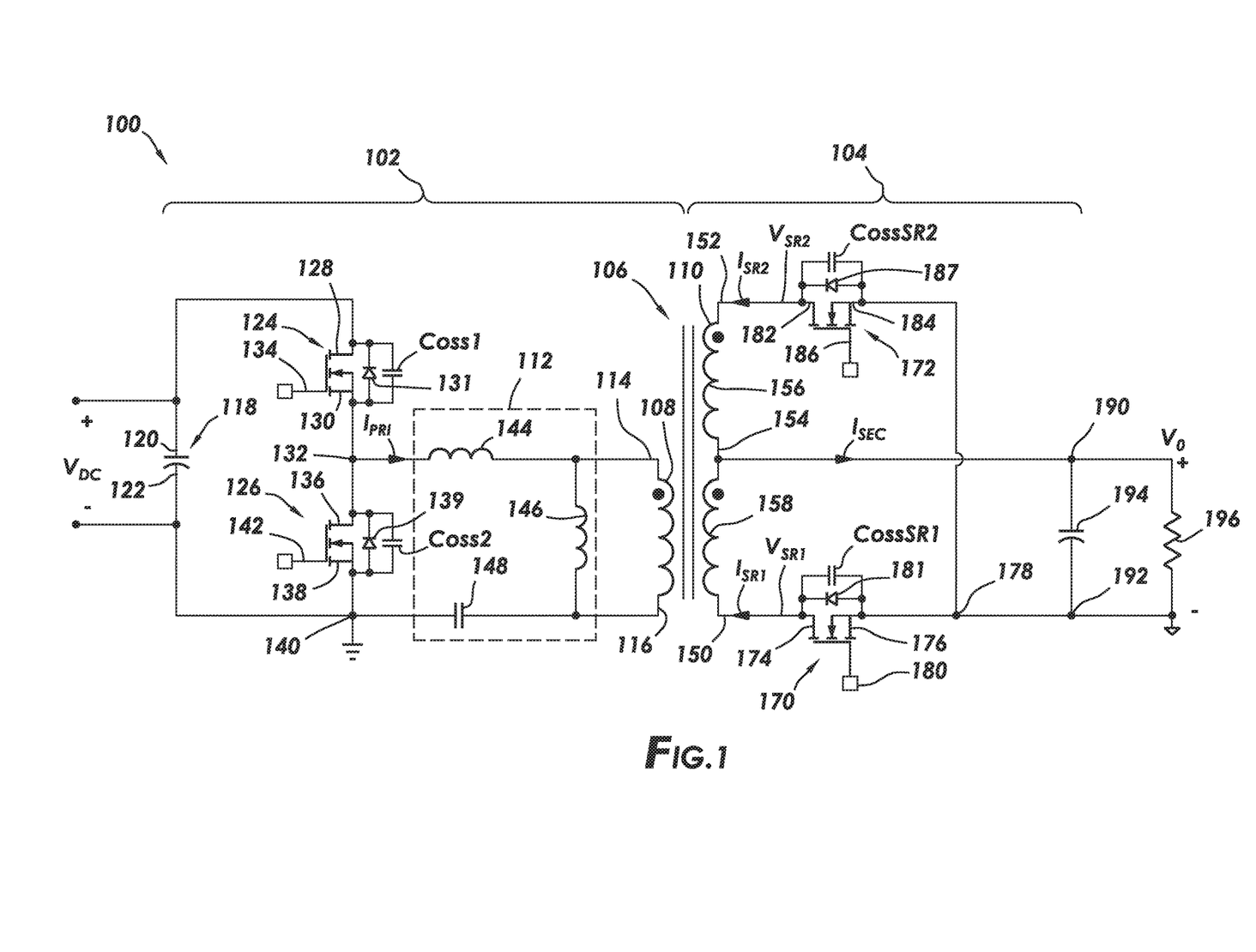
FIG. 1 shows an electrical schematic of a resonant power converter in accordance with at least some embodiments.

FIG. 1 shows a resonant power converter 100 in accordance with at least some embodiments. In particular, the resonant power converter 100 of FIG. 1 comprises a primary side 102 and a secondary side 104 coupled by a transformer 106 having a primary winding 108 and a secondary winding 110. The primary side 102 includes an inductor-inductor-capacitor (LLC) resonant tank 112, which is tuned to resonate at a specific frequency to supply an alternating current (AC) power to the primary winding 108 of the transformer 106.

Working from left to right in FIG. 1, the resonant power converter 100 comprises an input capacitor 118 defining a first lead 120 and a second lead 122 coupled to an input DC voltage (hereafter input voltage $V_{DC}$), a high-side FET 124 and a low-side FET 126. The FETs 124 and 126 are examples used in many cases; however, the FETs are representative of any device that may be used as an electrically controlled switch (e.g., transistors, junction transistors, Gallium nitride (GaN) High-electron-mobility transistors (HEMT), silicon carbide (SiC) devices, FETs of other types, and silicon controlled rectifiers).

The high-side FET 124 has a drain 128 coupled to the first lead 120 of the input capacitor 118, and a source 130 coupled to a switch node 132. The high-side FET 124 also has a gate 134 which couples to a primary-side controller (not shown). A first body diode 131 is connected between the drain 128 and the source 130 of the high-side FET 124. The high-side FET 124 exhibits a parasitic capacitance Coss1 between the drain 128 and the source 130, as indicated by capacitor Coss1 shown connected therebetween. Capacitor Coss1 is not a separate physical device, but is an effect resulting from the physical construction of the high-side FET 124. When commanded by the primary-side controller by assertion of the gate 134, the high-side FET 124 couples the switch node 132 (and thus resonant tank 112) to the input voltage $V_{DC}$. The low-side FET 126 has a drain 136 coupled to the switch node 132, and a source 138 coupled to a primary reference node 140, which is connected to ground. The low-side FET 126 also has a gate 142 coupled to the primary-side controller. A second body diode 139 is connected between the drain 136 and the source 138 of the low-side FET 126. The low-side FET 126 also exhibits a parasitic capacitance Coss2 between the drain 136 and the source 138, as indicated by capacitor Coss2 shown connected therebetween. Capacitor Coss2 is not a separate physical device, but is an effect resulting from the physical construction of the low-side FET 126. When commanded by the primary-side controller by assertion of the gate 142, the low-side FET 126 couples the switch node 132 to ground on the primary side. In operation, the primary-side controller alternately couples the switch node 132 to the input voltage $V_{DC}$ and then to ground by way of the high-side FET 124 and low-side FET 126, respectively, creating an alternating current (AC) signal at the switch node 132, and thus supplying a primary current $I_{PRI}$ to the resonant tank 112.

The resonant tank 112 of the resonant power converter 100 includes a resonant inductor 144, a parallel inductance 146, and a resonant capacitor 148. Specifically, and as shown in FIG. 1, the resonant inductor 144 is connected between the switch node 132 and the first lead 114 of the transformer 106. The resonant capacitor 148 is connected between the primary reference node 140 the second lead 116 of the transformer 106. A parallel inductance 146 is connected between the first lead 114 and the second lead 116 of the transformer 106 and in parallel with the primary winding 108 of the transformer 106. In some embodiments, the parallel inductance 146 is a magnetizing inductance of the primary winding 108 of the transformer 106 and not a separate component as shown in FIG. 1.

Still referring to FIG. 1, the secondary side 104 of the resonant power converter 100 includes the secondary winding 110 of the transformer 106 defines a third lead 150 and a fourth lead 152 and a center tap 154. The center tap 154 divides the secondary winding 110 into an upper winding 156 and a lower winding 158, with each of the upper and lower windings 156, 158 having an equal number of turns. The secondary winding 110 of the transformer 106 defines a third lead 150 and a fourth lead 152, with the lower winding 158 connected between the center tap 154 and the third lead 150, and with the upper winding 156 connected between the center tap 154 and the fourth lead 152. The polarities of the respective windings 108, 156, 158 are indicated according to the dot convention.

The secondary side 104 of the resonant power converter 100 further includes a first SR FET 170 coupled to the third lead 150 of the transformer 106 and a second SR FET 172 coupled to the fourth lead 152 of the transformer 106. The FETs 170 and 172 are examples used in many cases; however, the FETs are representative of any device that may be used as an electrically controlled switch (e.g., transistors, junction transistors, Gallium nitride (GaN) High-electron-mobility transistors (HEMT), silicon carbide (SiC) devices, FETs of other types, and silicon controlled rectifiers).

Each of the SR FETs 170, 172 is configured to pass current in one direction and to block current flow in an opposite direction. In the example shown in FIG. 1, the first SR FET 170 includes a drain 174 coupled to the third lead 150 of the transformer 106, and a source 176 coupled to a secondary reference node 178 and together defining a drain-source voltage $V_{SR1}$. A third body diode 181 is connected between the drain 174 and the source 176 of the first SR FET 170. The first SR FET 170 also has a gate 180 which couples to a rectification controller (not shown). When commanded by the rectification controller by assertion of the gate 180, the first SR FET 170 couples the secondary reference node 178 to the third lead 150 of the transformer 106, thereby allowing a first SR current Ism to flow from the secondary reference node 178 into the lower winding 158 of the transformer 106. The first SR FET 170 exhibits a parasitic capacitance CossSR1 between the drain 174 and the source 176, as indicated by capacitor CossSR1 shown connected therebetween. Capacitor CossSR1 is not a separate physical device, but is an effect resulting from the physical construction of the first SR FET 170.

Similarly, the second SR FET 172 includes a drain 182 coupled to the fourth lead 152 of the transformer 106, and a source 184 coupled to the secondary reference node 178 and together defining a drain-source voltage $V_{SR2}$. A fourth body diode 187 is connected between the drain 182 and the source 184 of the second SR FET 172. The second SR FET 172 also has a gate 186 which couples to a rectification controller (not shown). When commanded by the rectification controller by assertion of the gate 186, the second SR FET 172 couples the secondary reference node 178 to the fourth lead 152 of the transformer 106, thereby allowing a second SR current $I_{SR2}$ to flow from the secondary reference node 178 into the upper winding 156 of the transformer 106. The second SR FET 172 exhibits a parasitic capacitance CossSR2 between the drain 182 and the source 184, as indicated by capacitor CossSR2 shown connected therebetween. Capacitor CossSR2 is not a separate physical device, but is an effect resulting from the physical construction of the second SR FET 172.

The secondary side 104 of the resonant power converter 100 defines a positive output 190 coupled to the center tap 154 and a negative output 192 coupled to the secondary reference node 178. In example systems, the positive output 190 and negative output 192 define the output voltage $V_O$ of the resonant power converter 100. The example resonant power converter 100 further comprises a smoothing or output capacitor 194 coupled across the positive output 190 and the negative output 192. The output capacitor 194 filters and smooths the rectified signal produced by the SR FETs 170, 172 to create the output voltage $V_O$. The SR FETs 170, 172 function together to cause the secondary winding 110 of the transformer 106 to supply a secondary current $I_{SEC}$ from the center tap 154 to the positive output 190 and to prevent the secondary current from flowing in an opposite direction, into the center tap 154. The resonant power converter 100 thus supplies power to a load coupled across positive output 190 and the negative output 192, with an example load shown as resistor 196.

Figure 2:
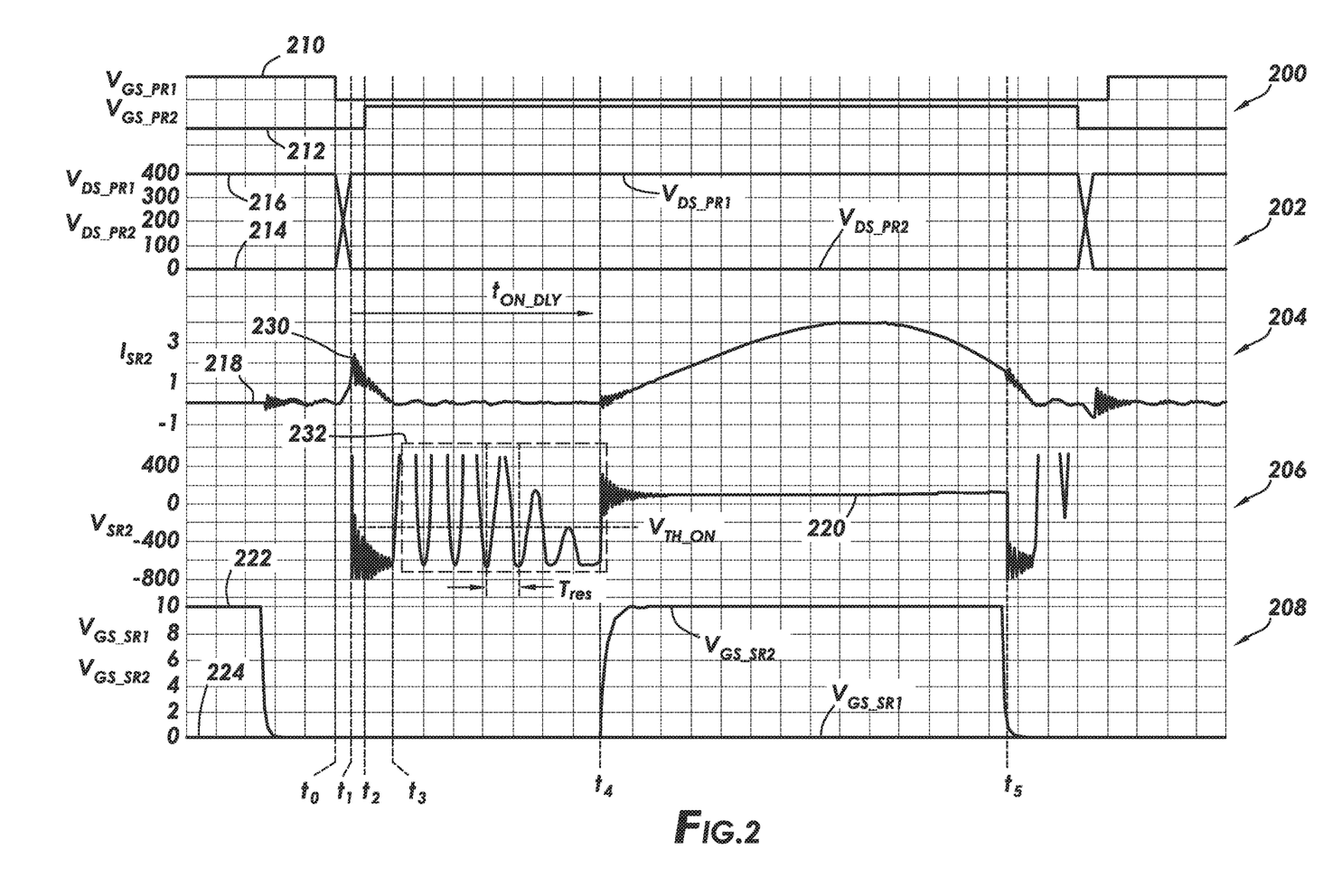
FIG. 2 shows a timing diagram in accordance with at least some embodiments.

FIG. 2 shows a timing diagram of signals within an operating cycle of the resonant power converter 100 in a low-load condition in accordance with at least some embodiments. Specifically, FIG. 2 has five graphs or plots 200, 202, 204, 206, and 208, shown with a common time axis. Plot 200 shows a gate-source voltage $V_{GS\_PR1}$ of the high-side FET 124 over time as line 210 and a gate-source voltage $V_{GS\_PR2}$, of the low-side FET 126 over time as line 212. Plot 202 shows a drain-source voltage $V_{DS\_PR1}$ of the high-side FET 124 over time as line 214 and a drain-source voltage $V_{DS\_PR2}$, of the low-side FET 126 over time as line 216.

Plot 202 shows the gate-source voltage $V_{GS\_PR1}$, of the high-side FET 124 dropping from a high, or asserted state to a low, or de-asserted state as the high-side FET 124 is switched from a conductive state to a non-conductive state at time $t_0$. The drain-source voltage $V_{DS\_PR1}$ of the high-side FET 124 drops at a steady rate from time $t_0$ until it reaches 0 V at time $t_1$. Simultaneously, the drain-source voltage $V_{DS\_PR2}$, of the low-side FET 126 increases at a steady rate from 0 V at from time to until it reaches a constant value at time $t_1$.

Plot 204 shows the second SR current $I_{SR2}$ through the second SR FET 172 over time as line 218. The second SR current $I_{SR2}$ increases between time $t_0$ and time $t_1$. Starting at time $t_1$, the resonant tank 112 is unable to transfer power to the secondary side 104. At this time $t_1$, the body diode of the first SR FET 170 remains off, and current cannot flow through the first SR FET 170 to charge the parasitic capacitance CossSR1 of the first SR FET 170, resulting in a sudden increase of the second SR current $I_{SR2}$, which is called a capacitive current spike 230. The second SR current $I_{SR2}$ decreases after the capacitive current spike 230 with a slope of $n^2 \times (V_o + V_F)/L_P$, where n is the number of turns of the transformer 106, $V_o$ is the output voltage, $V_F$ is the forward voltage of a body diode connected across the second SR FET 172, and $L_P$ is the inductance value of the parallel inductance 146.

Plot 206 shows the drain-source voltage $V_{SR2}$ of the second SR FET 172 over time as line 220. Specifically, plot 206 shows the drain-source voltage $V_{SR2}$ falling steeply and dropping below an on-threshold voltage $V_{TH\_ON}$ at time $t_1$ and undergoing an oscillation with an attenuating amplitude until time $t_3$. In addition, the drain-source voltage $V_{SR2}$ of the second SR FET 172 shown in plot 206 defines a sub-resonance 232 starting at time $t_3$ and having a sub-resonance period $T_{RES}$. The sub-resonance 232 results from an interaction between the SR FETs 170, 172, the resonant inductor 144, and the parallel inductance 146. The sub-resonance period $T_{RES}$ can be calculated by: $T_{RES}=2\pi \sqrt{(Lr\|Lp)n^2(CossSR1+CossSR2)}$, where Lr∥Lp is the inductance of a parallel combination of the resonant inductor 144 and the parallel inductance 146, n is the number of turns of the transformer 106, CossSR1 is the parasitic capacitance of the first SR FET 170, and CossSR2 is the parasitic capacitance of the second SR FET 172.

Plot 208 shows a gate-source voltage $V_{GS\_SR1}$ of the first SR FET 170 over time as line 222, and a gate-source voltage $V_{GS\_SR2}$, of the second SR FET 172 over time as line 224. Plot 208 includes the gate-source voltage $V_{GS\_SR2}$ transitioning from a de-asserted state of about 0 V to an asserted state having a value of 10 V beginning at time $t_4$, and remaining asserted until time $t_5$. The second SR FET 172 switches from a non-conductive state to a conductive state with the gate-source voltage $V_{GS\_SR2}$ asserted. Then, and as shown in plot 204, the second SR current $I_{SR2}$ through the second SR FET 172 increases approximately sinusoidally beginning at time $t_4$.

Time $t_4$ depends upon several factors including the design of the LLC resonant tank 112, parasitic capacitance of the SR FETs 170, 172 (CossSR1, CossSR2), and the impedance of the load. In cases where the second SR FET 172 is switched to the conductive state before time $t_4$, an inversion current flows through the second SR FET 172, with the second SR current $I_{SR2}$ having a negative value. As shown on plot 204, the difference in time between time $t_1$, when the drain-source voltage $V_{SR2}$ first drops below the on-threshold voltage $V_{TH\_ON}$, and time $t_4$, when the second SR FET 172 can be switched to the conductive state without causing an inversion current, is an optimal on-time delay $t_{ON\_DLY}$.

Figure 3:
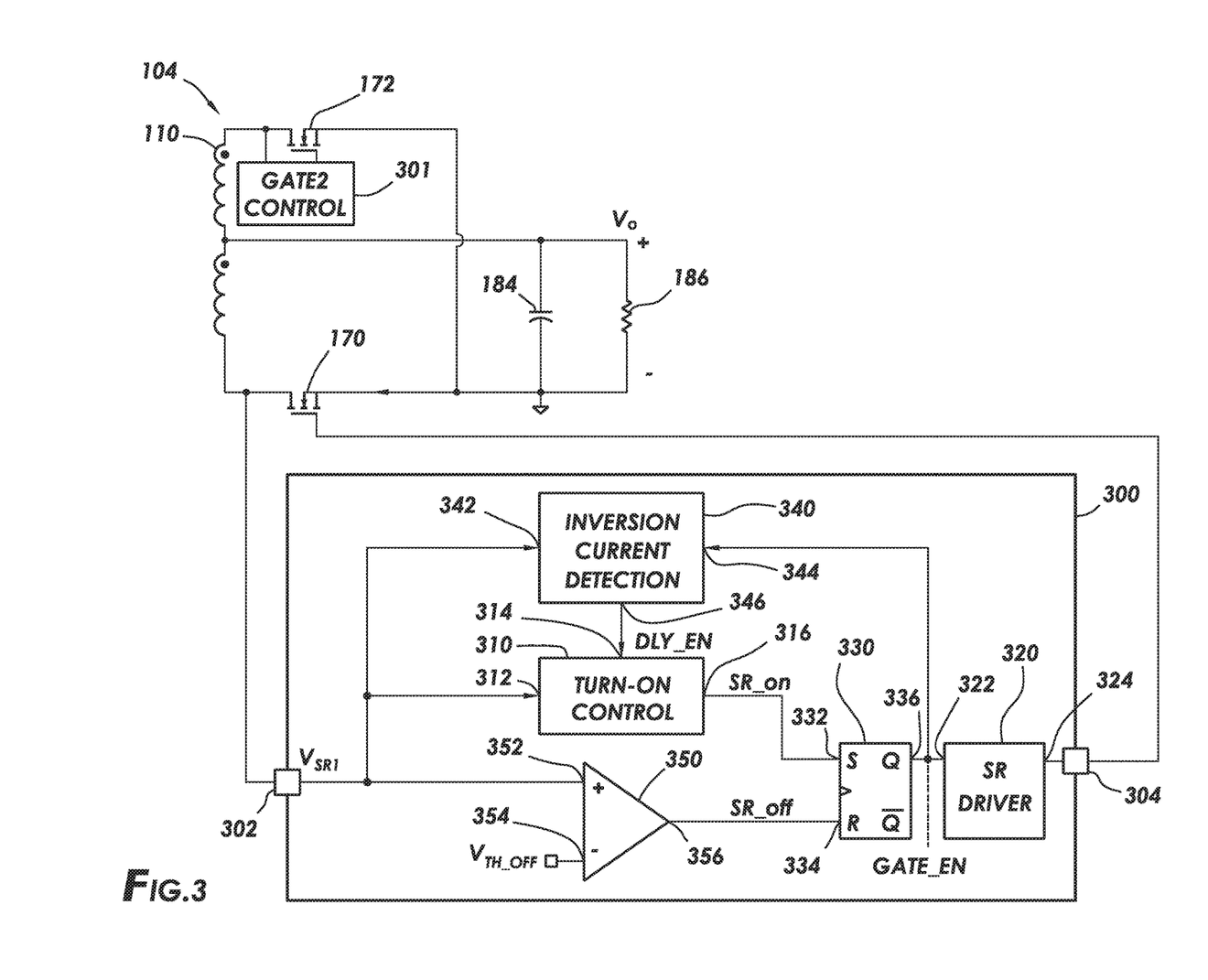
FIG. 3 shows an electrical schematic of a secondary side of a resonant power converter in accordance with at least some embodiments.

FIG. 3 shows an electrical schematic of a secondary side of a resonant power converter in accordance with at least some embodiments. In particular, FIG. 3 shows the secondary side with a first rectification controller 300 coupled to the first SR FET 170 and a second rectification controller 301 coupled to the second SR FET 172. Each of the rectification controllers 300, 301 may be similar in construction and operation, so only one of the rectification controllers 300, 301 is detailed and described here for simplicity of the disclosure. The first rectification controller 300 defines a drain sense terminal 302, and a gate terminal 304. The drain sense terminal 302 has the drain-source voltage $V_{SR1}$ with the source 176 of the first SR FET 170 connected to the common secondary reference node 178, as discussed above. Additional terminals would also be present (e.g., ground terminal), but those additional terminals are not shown so as not to unduly complicate the figure.

The first rectification controller 300 includes a turn-on controller 310 including a drain sense input 312 coupled to the drain sense terminal 302, an enable input 314, and an on-delay output 316 coupled to the gate terminal 304. In operation, the turn-on controller 310 is configured to assert the on-delay output 316 to assert an SR turn-on signal SR_on, and to thereby cause an associated one of the SR FETs 170, 172 (the first SR FET 170 in the example shown in FIG. 3) to a conductive state in response to the drain-source voltage $V_{SR1}$ being less than an on-threshold voltage $V_{TH\_ON}$ for an adaptive delay time $t_{ADP\_ON}$ and while the delay-enable signal DLY_EN is asserted (i.e. while the enable input 314 is asserted). The turn-on controller 310 is described in more detail, below, with reference to FIG. 5.

In some embodiments, and as shown in FIG. 3, the on-delay output 316 of the turn-on controller 310 is coupled to the gate terminal 304 via an SR driver 320. Specifically, the SR driver 320 includes a signal input 322 and a driver output 324 coupled to the gate terminal 304. The SR driver 320 is configured to energize the gate terminal 304 with the signal input 322 being asserted. In some embodiments, and as also shown in FIG. 3, the first rectification controller 300 also includes a first set-reset block 330 to maintain the gate terminal 304 in an energized state. The first set-reset block 330 includes a set input 332 connected to the on-delay output 316 of the turn-on controller 310 and a reset input 334 and a latching output 336 connected to the signal input 322 of the SR driver 320 to assert a gate enable signal GATE_EN. The first set-reset block 330 (e.g., a Set-Reset flip-flop) is configured to assert the latching output 336 in response to assertion of the SR turn-on signal SR_on on the set input 332 and to de-assert the latching output 336 in response to assertion of the reset input 334.

In some embodiments, and as shown in FIG. 3, the first rectification controller 300 also includes a current inversion detection block 340 defining a first input 342 coupled to the drain sense terminal 302, and a second input 344 coupled to the latching output 336 of the first set-reset block 330, and a delay-enable output 346. The current inversion detection block 340 functions to detect an inversion current in an associated one of the SR FETs 170, 172 (the first SR FET 170 in the example shown in FIG. 3). An inversion current is defined as an electrical current flowing through the associated one of the SR FETs 170, 172 in an opposite direction from the normal, or preferred direction. In some embodiments, and as shown in FIG. 1, the first SR current $I_{SR1}$ or the second SR current $I_{SR2}$ having a negative value would be an inversion current through the associated one of the SR FETs 170, 172. Such an inversion current can result when the resonant power converter 100 is operating in light-load condition in which a secondary voltage across the upper winding 156 or the lower winding 158 within the secondary winding 110 of the transformer 106 is below the output voltage $V_o$ of the resonant power converter 100. The example current inversion detection block 340 is configured to assert the delay-enable output 346 and thus to generate a delay-enable signal DLY_EN in response to the first input 342 having a voltage greater than a predetermined inversion detect voltage $V_{SRC\_INV}$ while the gate terminal 304 of the first rectification controller 300 is energized. The current inversion detection block 340 is described in more detail, below, with reference to FIG. 4.

Still referring to FIG. 3, the first rectification controller 300 also includes an off-threshold comparator 350 defining a non-inverting input 352 connected to the drain sense terminal 302 and an inverting input 354 having an off-threshold voltage $V_{TH\_OFF}$. The off-threshold comparator 350 also defines a comparator output 356 connected to the reset input 334 of the first set-reset block 330. The off-threshold comparator 350 is configured to assert the comparator output 356 to assert an SR turn-off signal SR_off (and thus, the reset input 334 of the first set-reset block 330) in response to the drain-source voltage $V_{SR1}$ on the non-inverting input 352 being greater than the off-threshold voltage $V_{TH\_OFF}$ on the inverting input 354.

Figure 4:
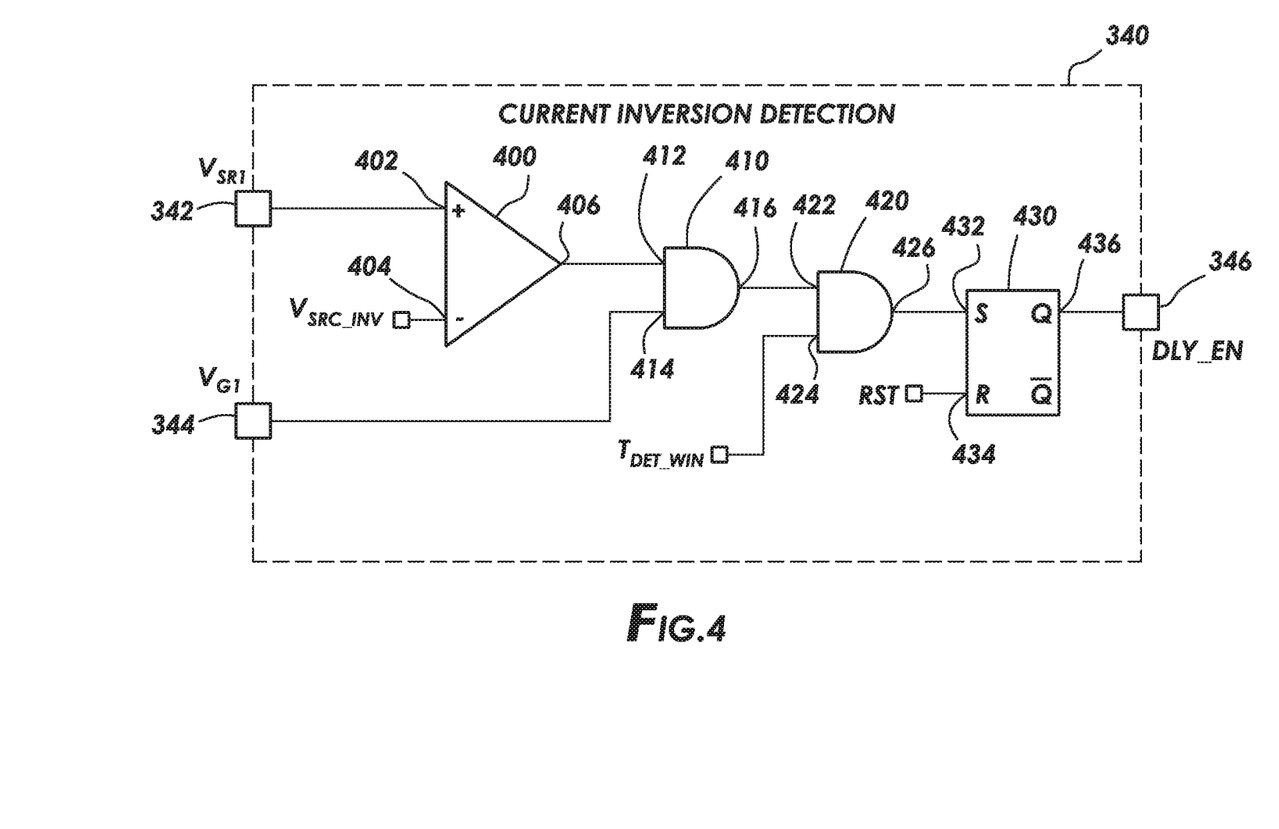
FIG. 4 shows an electrical schematic of a current inversion detection block of a rectification controller in accordance with at least some embodiments.

FIG. 4 shows an electrical schematic of a current inversion detection block 340 of the first rectification controller 300 in accordance with at least some embodiments. The current inversion detection block 340 defines the first input 342, the second input 344, and the delay-enable output 346, as discussed above with reference to FIG. 3. The current inversion detection block 340 includes an inversion detection comparator 400 defining a non-inverting input 402 connected to the first input 342, and thus to the drain-source voltage $V_{SR1}$. The inversion detection comparator 400 also defines an inverting input 404 having an inversion reference voltage $V_{SRC\_INV}$, and a comparator output 406. The inversion detection comparator 400 is configured to assert the comparator output 406 in response to the drain-source voltage $V_{SR1}$ on the non-inverting input 402 being greater than the inversion reference voltage $V_{SRC\_INV}$ on the inverting input 404. In some embodiments, the inversion reference voltage $V_{SRC\_INV}$ may be equal to or about 0.0 mV.

Still referring to FIG. 4, the current inversion detection block 340 also includes a first AND gate 410 defining a first input 412 connected to the comparator output 406 of the inversion detection comparator 400 and a second input 414 and a signal output 416. The first AND gate 410 is configured to assert the signal output 416 with both the first and second inputs 412, 414 being asserted, and to de-assert the signal output 416 if one or both of the first and second inputs 412, 414 are de-asserted. The second input 414 is connected to the second input 344, and is therefore asserted by the gate enable signal GATE_EN. The current inversion detection block 340 also includes a second AND gate 420 defining a first input 422 connected to the signal output 416 of the first AND gate 410 and a second input 424 and a signal output 426. The second AND gate 420 is configured to assert the signal output 426 with both the first and second inputs 422, 424 being asserted, and to de-assert the signal output 426 if one or both of the first and second inputs 422, 424 are de-asserted. In some embodiments, and as shown in FIG. 4, the second input 424 of the second AND gate 420 is connected to an external circuit (not shown) to receive a detection window $T_{DET\_WIN}$ signal for preventing the current inversion detection block 340 from mis-triggering at or near the end of the SR conduction period. In some embodiments, the detection window $T_{DET\_WIN}$ signal is asserted for a period of time equal to one-half (½) of the previous SR conduction period, which is the time that the corresponding one of the SR FETs 170, 172 is in a conductive state. In some embodiments, the detection window $T_{DET\_WIN}$ signal may begin when the corresponding one of the SR FETs 170, 172 is first switched to the conductive state, for example, when its gate-source voltage $V_{GS\_SR1}$, $V_{GS\_SR2}$ is asserted.

In some embodiments, and as also shown in FIG. 4, the current inversion detection block 340 also includes a second set-reset block 430 to maintain the delay-enable output 346 in an asserted state until a reset signal RST is asserted. The second set-reset block 430 includes a set input 432 connected to the signal output 426 of the second AND gate 420 and a reset input 434 and a latching output 436 connected to the delay-enable output 346 of the current inversion detection block 340. The second set-reset block 430 is configured to assert the latching output 436 in response to assertion of the set input 432 and to de-assert the latching output 436 in response to assertion of the reset input 434. In some embodiments, the reset signal RST is asserted by a load detection circuit (not shown) in response to the resonant power converter 100 being in a heavy-load condition, in which the adaptive on-delay function may be disabled by de-asserting the delay-enable output 346.

Figure 5:
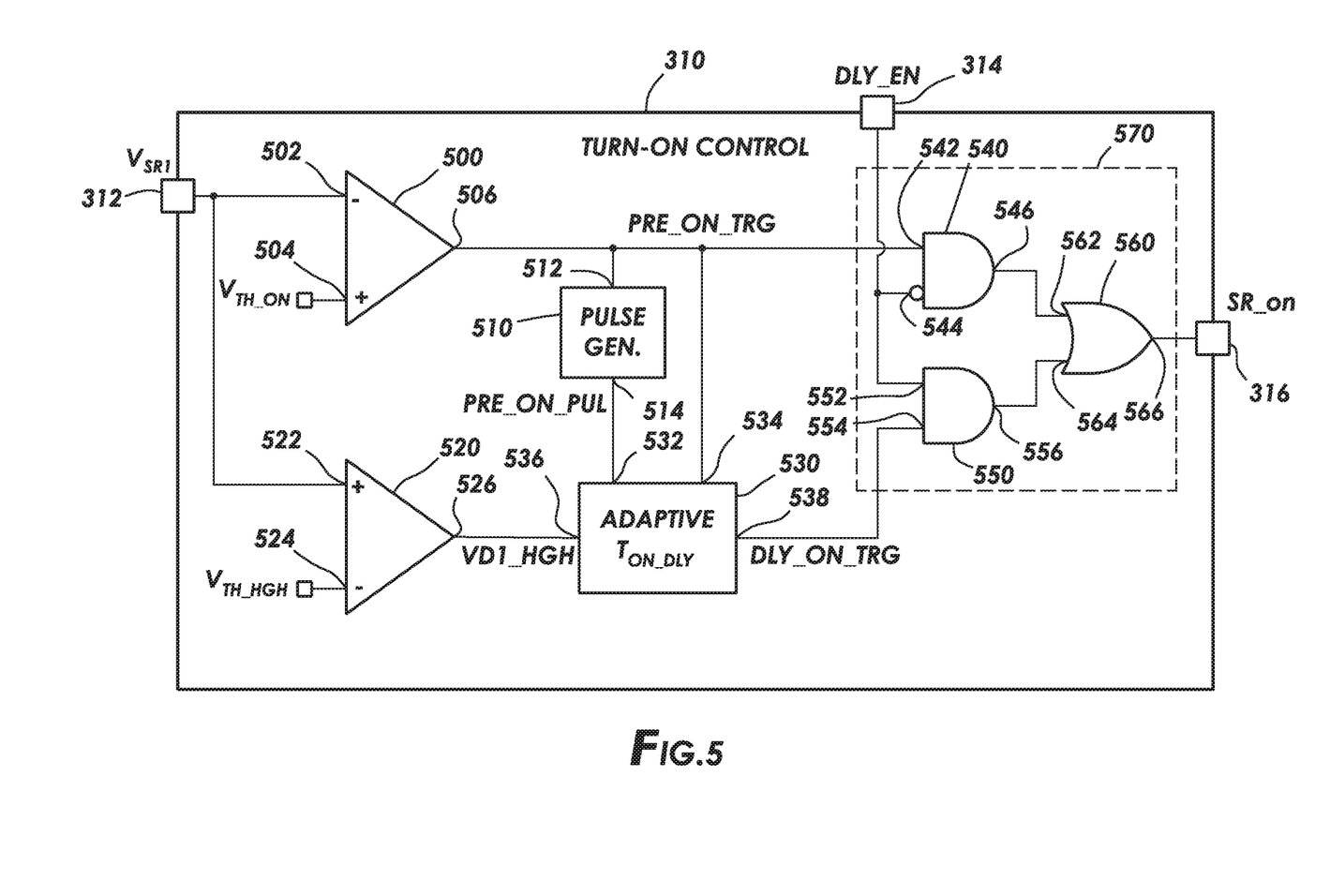
FIG. 5 shows an electrical schematic of a turn-on controller of a rectification controller in accordance with at least some embodiments.

FIG. 5 shows an electrical schematic of a turn-on controller 310 of a first rectification controller 300 in accordance with at least some embodiments. The turn-on controller 310 defines the drain sense input 312, the enable input 314, and the on-delay output 316, as discussed above with reference to FIG. 3. The turn-on controller 310 includes an on-threshold comparator 500 defining an inverting input 502 connected to the drain sense input 312, and thus to the drain-source voltage $V_{SR1}$. The on-threshold comparator 500 also defines a non-inverting input 504 having an on-threshold voltage $V_{TH\_ON}$, and a comparator output 506. The on-threshold comparator 500 is configured to assert the comparator output 506 in response to the drain-source voltage $V_{SR1}$ on the inverting input 502 being less than the on-threshold voltage $V_{TH\_ON}$ on the non-inverting input 504. In some embodiments, the on-threshold voltage $V_{TH\_ON}$ is between −0.5 volts (V) and 0.0 V. In some embodiments, the on-threshold voltage $V_{TH\_ON}$ may be equal to or about −0.1

V. In some embodiments, the on-threshold voltage $V_{TH\_ON}$ may be equal to or about −0.25 V.

The turn-on controller 310 includes a pre-on pulse generator 510 defining an enable input 512 coupled to the comparator output 506 of the on-threshold comparator 500, and a pulse output 514. The pre-on pulse generator 510 is configured to assert the pulse output 514 for a pulse duration, and to thereby provide a pre-on pulse signal PRE_ON_PUL in response to a state transition of a signal using the drain-source voltage $V_{SR1}$. More specifically, the pre-on pulse generator 510 generates the pre-on pulse signal PRE_ON_PUL in response to the drain-source voltage $V_{SR1}$ being less than the on-threshold voltage $V_{TH\_ON}$ as indicated by the comparator output 506 of the on-threshold comparator 500 being asserted. The pulse duration may be, for example, a single clock cycle of a clock within the first rectification controller 300. The turn-on controller 310 also includes a reset-threshold comparator 520 defining a non-inverting input 522 connected to the drain sense input 312, and thus to the drain-source voltage $V_{SR1}$. The reset-threshold comparator 520 also defines an inverting input 524 having a reset-threshold voltage $V_{TH\_HGH}$, and a comparator output 526. The reset-threshold comparator 520 is configured to assert the comparator output 526, and to thereby provide a memory block reset signal VD1_HGH to the adaptive on-delay controller 530, in response to the drain-source voltage $V_{SR1}$ on the non-inverting input 522 being greater than the reset-threshold voltage $V_{TH\_HGH}$ on the inverting input 524. In some embodiments, the reset-threshold voltage $V_{TH\_HGH}$ may be equal to or about 0.8 V.

Still referring to FIG. 5, the turn-on controller 310 also includes an adaptive on-delay controller 530 defining a first input terminal 532 coupled to the pulse output 514 of the pre-on pulse generator 510, and a second input terminal 534 coupled directly to the comparator output 506 of the on-threshold comparator 500, and a third input terminal 536 coupled to the comparator output 526 of the reset-threshold comparator 520. The adaptive on-delay controller 530 also includes an on-delay output 538. The adaptive on-delay controller 530 is configured to determine the adaptive delay time $t_{ADP\_ON}$ and to assert the on-delay output 538, and to thereby provide a delay-on trigger signal DLY_ON_TRG, in response to the drain-source voltage $V_{SR1}$ being less than the on-threshold voltage $V_{TH\_ON}$ for the adaptive delay time $t_{ADP\_ON}$. Internal details of an example embodiment of the adaptive on-delay controller 530 are shown in FIG. 6 and are described below.

The turn-on controller 310 also includes a third AND gate 540 defining a first input 542 connected to the comparator output 506 of the on-threshold comparator 500, and a second input 544 connected to the enable input 314 of the turn-on controller 310, and a signal output 546. The second input 544 is an inverting input as indicated by the circle adjacent thereto. The third AND gate 540 is configured to assert the signal output 546 with first input 542 being asserted and with the second input 544 being de-asserted. The third AND gate 540 is configured to de-assert the signal output 426 if either the first input 542 is de-asserted or if the second input 544 is asserted. The turn-on controller 310 also includes also includes a fourth AND gate 550 defining a first input 552 connected to the enable input 314 of the turn-on controller 310, and a second input 554 connected to the on-delay output 538 of the adaptive on-delay controller 530, and a signal output 556. The fourth AND gate 550 is configured to assert the signal output 556 with both the first and second inputs 552, 554 being asserted, and to de-assert the signal output 556 if one or both of the first and second inputs 552, 554 are de-asserted. The turn-on controller 310 also includes also includes an OR gate 560 defining a first input 562 connected to the signal output 546 of the third AND gate 540, and a second input 564 connected to the signal output 556 of the fourth AND gate 550, and a signal output 566 connected to the on-delay output 316 of the turn-on controller 310. The OR gate 560 is configured to assert the signal output 566 in response to either or both of the first input 562 and/or the second input 564 being asserted. The third AND gate 540, the fourth AND gate 550, and the OR gate 560 may be combined as a functional block called SR_ON logic block 570.

The third AND gate 540 and the fourth AND gate 550 and the OR gate 560 function together to assert the SR_on output 316 of the turn-on controller 310 with the drain-source voltage VSR1 being less than the on-threshold voltage $V_{TH\_ON}$ for the adaptive delay time $t_{ADP\_ON}$ when the enable input 314 of the turn-on controller 310 is asserted. The third AND gate 540 and the fourth AND gate 550 and the OR gate 560 also function together to assert the SR_on output 316 of the turn-on controller 310 immediately upon the drain-source voltage VSR1 being less than the on-threshold voltage $V_{TH\_ON}$ (i.e. without delaying for the adaptive delay time $t_{ADP\_ON}$) when the enable input 314 of the turn-on controller 310 is de-asserted.

Figure 6:
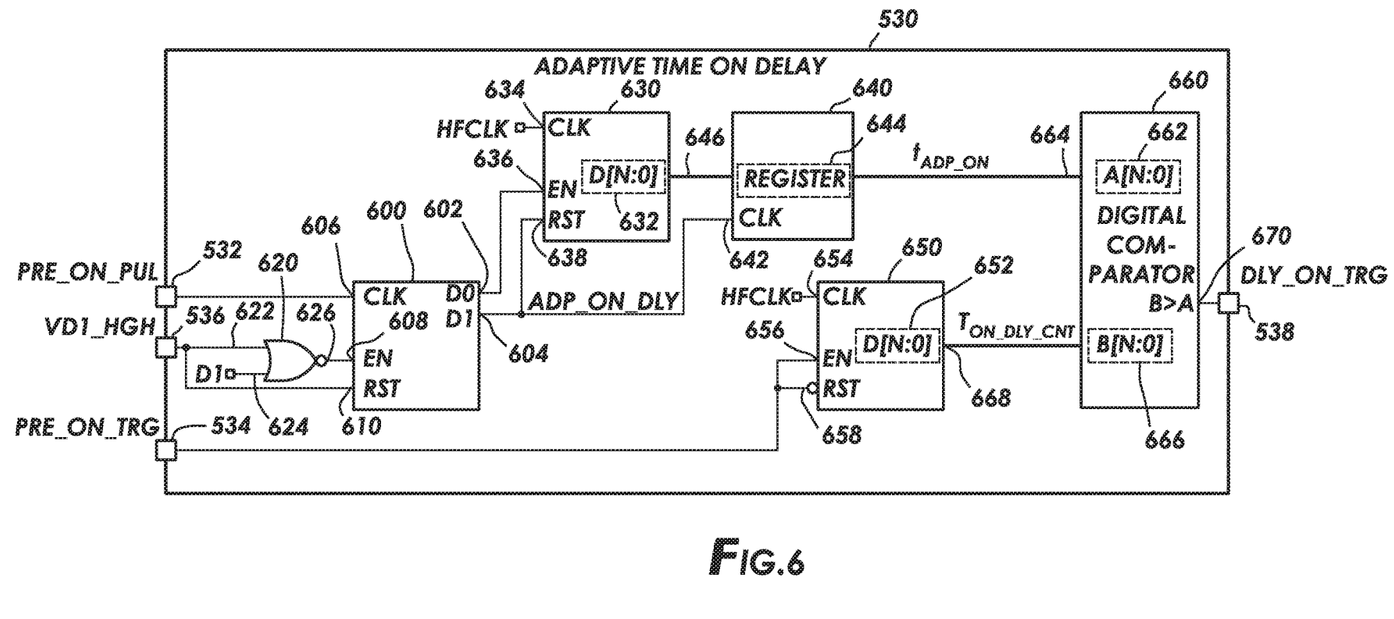
FIG. 6 shows a combination electrical schematic and block diagram of an adaptive on-delay controller in accordance with at least some embodiments.

FIG. 6 shows a combination electrical schematic and block diagram of the adaptive on-delay controller 530 in accordance with at least some embodiments. Specifically, the adaptive on-delay controller 530 includes a state memory block 600 defining a first state output 602, a second state output 604, a trigger input 606 connected to the first input terminal 532 of the adaptive on-delay controller 530, an enable input 608, and a reset input 610. The state memory block 600 is configured to de-assert both of the state outputs 602, 604 in an initial state. The state memory block 600 is configured to record a first state, with the first state output 602 asserted and with the second state output 604 de-asserted in response to the trigger input 606 and the enable input 608 both being asserted with the state memory block 600 in the initial state. The state memory block 600 is configured to record a second state, with the first state output 602 de-asserted and with the second state output 604 asserted in response to the trigger input 606 and the enable input 608 both being asserted with the state memory block 600 in the first state. Assertion of the second state output 604 generates an adaptive on-delay signal ADP_ON_DLY. The state memory block 600 is configured to return to the initial state in response to assertion of the reset input 610. In some embodiments, and as shown in FIG. 6, the state memory block 600 may take the form of a counter block, with the first and second state outputs 602, 604 being the two least significant bits of a counter accumulator register.

The adaptive on-delay controller 530 also includes a NOR gate 620 defining a first input 622 connected to the third input terminal 536 of the adaptive on-delay controller 530, and a second input, 624 connected to the second state output 604 of the state memory block 600, as indicated by the shared label "D1". The NOR gate 620 also defines a signal output 626 connected to the enable input 608 of the state memory block 600. The NOR gate 620 is configured to de-assert the signal output 626, and thus the enable input 608 of the state memory block 600 with either or both of the first input 622 and/or the second input 624 being asserted by the adaptive on-delay signal ADP_ON_DLY. The NOR gate 620, therefore, functions to cause the state memory block 600 to maintain the second state with the second state output 604 asserted and to ignore subsequent assertion of the trigger input 606 until the state memory block 600 is reset by assertion of the third input terminal 536 with the memory block reset signal VD1_HGH from the reset-threshold comparator 520.

The adaptive on-delay controller 530 also includes a first counter 630 having a first counter memory 632. The first counter 630 defines a count input 634 connected to a periodic clock signal HFCLK, an enable input 636 connected to the first state output 602 of the state memory block 600, and a reset input 638 connected to the second state output 604 of the state memory block 600. The first counter 630 is configured to increment a value of the first counter memory 632 after the first state transition of the signal using the drain-source voltage $V_{SR1}$ of the corresponding one of the SR FETs 170, 172. In some embodiments, the first state transition corresponds to the drain-source voltage $V_{SR1}$ of the corresponding one of the SR FETs 170, 172 dropping below the on-threshold voltage $V_{TH\_ON}$. Specifically, in some embodiments and as shown on FIG. 6, the first counter 630 is configured to increment a value of the first counter memory 632 in response to assertion of the count input 634 while the enable input 636 is asserted. The first counter 630 is also configured to reset the value of the first counter memory 632 in response to assertion of the adaptive on-delay signal ADP_ON_DLY upon the reset input 638. The adaptive on-delay controller 530 includes a storage register 640 defining a trigger input 642 connected to the second state output 604 of the state memory block 600 and responsive to the adaptive on-delay signal ADP_ON_DLY. The storage register 640 includes a storage memory 644 and is configured to store the value of from the first counter memory 632 of the first counter 630, in response to assertion of the trigger input 642. In some embodiments, and as shown in FIG. 6, the value of from the first counter memory 632 is communicated from the first counter 630 via a first data bus 646. In operation, the state memory block 600, the first counter 630, and the storage register 640 function together to record the adaptive delay time $t_{ADP\_ON}$ within the storage memory 644 as a number of pulses of the periodic clock signal HFCLK between first and second pre-on pulse signals PRE_ON_PUL within an operating cycle of the resonant power converter.

In some embodiments, the first rectification controller 300 is configured to adjust the adaptive delay time $t_{ADP\_ON}$ using a time differential between first and second state transitions of a signal using a comparison between the drain-source voltage $V_{SR1}$ and an adaptive delay voltage $V_{ADP\_ON}$. In some embodiments, as shown in FIGS. 3-6, the on-threshold comparator 500 functions as the adaptive delay comparator (i.e. the adaptive delay voltage $V_{ADP\_ON}$ equals the on-threshold voltage $V_{TH\_ON}$), and thus the adaptive delay time $t_{ADP\_ON}$ is set to equal a time between first and second state transitions of the comparator output 506 of the on-threshold comparator 500. More specifically, the first and second state transitions may each be rising edges, with the comparator output 506 changing from a de-asserted condition to an asserted condition in response to the drain-source voltage $V_{SR1}$ dropping below the on-threshold voltage $V_{TH\_ON}$.

In other embodiments, a different comparator may be used as the adaptive comparator to determine the conditions for setting the adaptive delay time $t_{ADP\_ON}$.

Still referring to FIG. 6, the adaptive on-delay controller 530 also includes a second counter 650 having a second counter memory 652 storing a time-on delay count value $T_{ON\_DLY\_CNT}$. The second counter 650 defines a count input 654 connected to the periodic clock signal HFCLK, an enable input 656 and a reset input 658 configured as active-low, as denoted by the circle. Both of the enable input 656 and the reset input 658 are connected to the second input terminal 534 for receiving the pre-on trigger signal PRE_ON_TRG. The second counter 650 is configured to increment a value of the second counter memory 652 in response to assertion of the count input 654 while the enable input 656 is asserted, and to reset the value of the second counter memory 652 in response to de-assertion of the reset input 658. In operation, the second counter measures the length of time that the drain-source voltage $V_{SR1}$ of the corresponding one of the SR FETs 170, 172 is less than the on-threshold voltage $V_{TH\_ON}$ by counting a number of pulses of the periodic clock signal HFCLK while the pre-on trigger signal PRE_ON_TRG is asserted.

In some embodiments, the first rectification controller 300 includes adaptive delay comparator for setting the length of the adaptive delay time $t_{ADP\_ON}$ and a triggering comparator configured to assert the on-delay output 316 of the turn-on controller 310 and to thereby drive the associated one of the SR FETs 170, 172 to its conductive state. In some embodiments, and as shown in FIGS. 5-6, the on-threshold comparator 500 serves as both the adaptive delay comparator, and also as the triggering comparator. In some embodiments, the adaptive delay comparator and the triggering comparator are responsive to the same condition, for example, the drain-source voltage $V_{SR1}$ being less than the on-threshold voltage $V_{TH\_ON}$. In other embodiments, the adaptive delay comparator and the triggering comparator may be responsive to different conditions. For example, the triggering comparator may cause the on-delay output 316 of the turn-on controller 310 to be asserted in response to the drain-source voltage $V_{SR1}$ being less than a triggering voltage that is different from an adaptive delay used as a reference by the adaptive delay comparator. In some embodiments, a shared comparator device may be used as both the adaptive delay comparator, and also as the triggering comparator, but with a reference value that is changed from one value with the shared compared device being used as the adaptive delay comparator to a different value with the shared compared device being used as the triggering comparator.

The adaptive on-delay controller 530 also includes a digital comparator 660 including a first storage register 662 configured to receive the adaptive delay time $t_{ADP\_ON}$ from the storage register 640 via a second data bus 664, and a second storage register 666 configured to receive the time-on delay count value $T_{ON\_DLY\_CNT}$ from the second counter 650 via a second bus 668. The digital comparator 660 also defines a comparator output 670 connected to the on-delay output 538. The digital comparator 660 is configured to assert the comparator output 670 in response to the value within the second storage register 666 being larger than the value in the first storage register 662. Thus, the adaptive on-delay controller 530 asserts a delay-on trigger signal DLY_ON_TRG in response to the pre-on trigger signal PRE_ON_TRG being asserted for longer than the adaptive delay time $t_{ADP\_ON}$ as indicated by the time-on delay count value $T_{ON\_DLY\_CNT}$ being greater than the adaptive delay time $t_{ADP\_ON}$.

Figure 7:
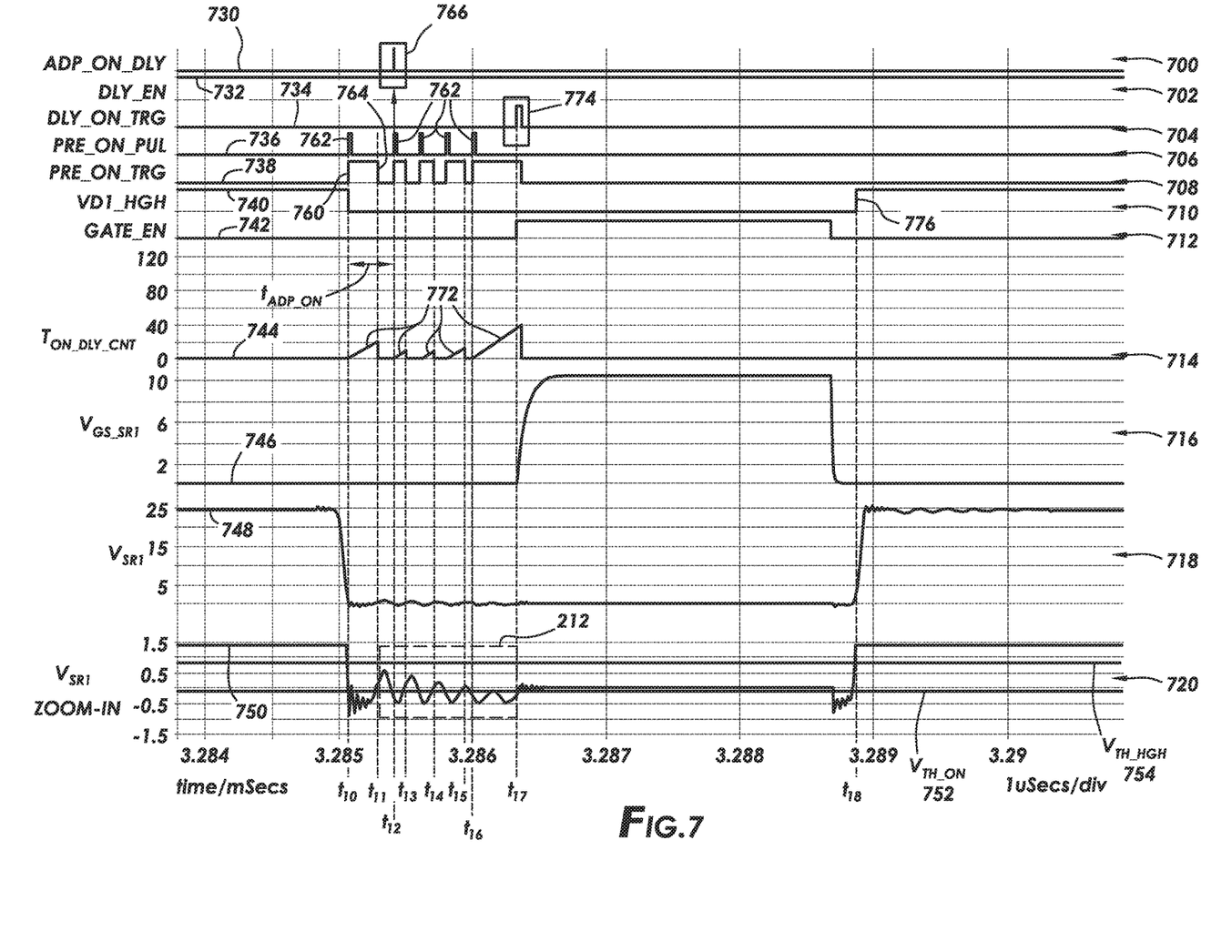
FIG. 7 shows a timing diagram in accordance with at least some embodiments.

FIG. 7 shows a timing diagram of signals within an operating cycle of the resonant power converter 100 in a low-load condition in accordance with at least some embodiments. Each of the signals shown on FIG. 7 relate to the operation of first rectification controller 300. Specifically, FIG. 7 has eleven graphs or plots 700-720, shown with a common time axis. Plot 700 shows the state of the adaptive on-delay signal ADP_ON_DLY over time as line 730; plot 702 shows the state of the delay-enable signal DLY_EN over time as line 732; plot 704 shows the state of the delay-on trigger signal DLY_ON_TRG over time as line 734; plot 706 shows the state of the pre-on pulse signal PRE_ON_PUL over time as line 736; plot 708 shows the state of the pre-on trigger signal PRE_ON_TRG over time as line 738; plot 710 shows the state of the memory block reset signal VD1_HGH over time as line 740; and plot 712 shows the state of the gate enable signal GATE_EN over time as line 742.

Plot 714 shows the value of the time-on delay count $T_{ON\_DLY\_CNT}$ over time as line 744. In some embodiments, and as shown on FIG. 7, the time-on delay count $T_{ON\_DLY\_CNT}$ tracks the length of time that the drain-source voltage $V_{SR1}$ of the first SR FET 170 is less than the on-threshold voltage $V_{TH\_ON}$. Plot 716 shows the gate-source voltage $V_{GS\_SR1}$ of the first SR FET 170 over time as line 746, which transitions from a de-asserted state of about 0 V to an asserted state having a value of 10 V beginning at time $t_{17}$. Plot 718 shows the drain-source voltage $V_{SR1}$ of the first SR FET 170 as line 748 on a scale of 0 to 25 volts; and plot 720 shows the drain-source voltage $V_{SR1}$ of the first SR FET 170 as line 750, together with the on-threshold voltage $V_{TH\_ON}$ as line 752 and the reset-threshold voltage $V_{TH\_HGH}$ as line 754 with a zoomed-in view having a scale of −1.5 to 1.5 volts.

FIG. 7 shows timing diagrams of an operating cycle of the resonant power converter 100 as pertains to the first SR FET 170. At time $t_{10}$ the drain-source voltage $V_{SR1}$ first drops below the on-threshold voltage $V_{TH\_ON}$. The pre-on trigger signal PRE_ON_TRG is then asserted as indicated by the rising edge 760 shown in plot 708. The pre-on pulse signal PRE_ON_PUL is asserted for a momentary pulse 762 in response. For practical purposes, each of the rising edge 760 and the momentary pulse 762 can be said to happen at time $t_{10}$, with the drain-source voltage $V_{SR1}$ first dropping below the on-threshold voltage $V_{TH\_ON}$. At time $t_{11}$, the drain-source voltage $V_{SR1}$ rises back above the on-threshold voltage $V_{TH\_ON}$, resulting in the pre-on trigger signal PRE_ON_TRG being de-asserted, as indicated by the falling edge 764 shown in plot 708. At time $t_{12}$, the drain-source voltage $V_{SR1}$ drops below the on-threshold voltage $V_{TH\_ON}$ a second time. The pre-on trigger signal PRE_ON_TRG is asserted again as indicated by the rising edge 760 shown in plot 708. The pre-on pulse signal PRE_ON_PUL is also asserted for a momentary pulse 762 at time $t_{12}$. The adaptive on-delay signal ADP_ON_DLY asserted for a momentary pulse 766 in response to the second pre-on trigger signal PRE_ON_TRG at time $t_{12}$. The time between the first and second momentary pulses 762 of the pre-on pulse signal PRE_ON_PUL (i.e. the difference between time $t_{10}$ and time $t_{11}$) is recorded as the adaptive delay time $t_{ADP\_ON}$.

Referring now to plot 720, the drain-source voltage $V_{SR1}$ defines a sub-resonance 232 starting at time $t_{11}$ lasting until time $t_{17}$. That sub-resonance 232 is described in more detail, above with reference to FIG. 2. Plot 714 shows the value of the time-on delay count $T_{ON\_DLY\_CNT}$ over time as line 744, which defines several ramps 772, with each of the ramps 772 showing the value of the time-on delay count $T_{ON\_DLY\_CNT}$ increasing while the pre-on trigger signal PRE_ON_TRG is asserted and resetting when the pre-on trigger signal PRE_ON_TRG is de-asserted (i.e. at times $t_{11}$, $t_{13}$, $t_{14}$, and $t_{15}$).

Plot 704 shows line 734 defining a momentary pulse 774 at time $t_{17}$, indicating the delay-on trigger signal DLY_ON_TRG being asserted in response to the time-on delay count $T_{ON\_DLY\_CNT}$ exceeding the value of the adaptive delay time $t_{ADP\_ON}$. In other words, time $T_{17}$ is determined as the time when the pre-on trigger signal PRE_ON_TRG having been asserted for a continuous length of time exceeding the adaptive delay time $t_{ADP\_ON}$. In some embodiments, that momentary pulse 774 of the delay-on trigger signal DLY_ON_TRG is used to control the first SR FET 170 as indicated by line 746 on plot 716, showing the gate-source voltage $V_{GS\_SR1}$ transitioning from a de-asserted state of about 0 V to an asserted state having a value of 10 V beginning at time $t_{17}$.

Plot 710 shows the memory block reset signal VD1_HGH becoming asserted a rising edge 776 in line 740 at time $t_{18}$. In some embodiments, and as shown in FIG. 7, the memory block reset signal VD1_HGH is asserted in response to the drain-source voltage $V_{SR1}$ exceeding the reset-threshold voltage $V_{TH\_HGH}$ as shown on plot 720. In some embodiments, the memory block reset signal VD1_HGH is used to reset one or more circuits within the first rectification controller 300 in preparation for a subsequent operating cycle of the resonant power converter 100.

In some embodiments, and as shown in the plots of FIG. 7, the adaptive delay voltage $V_{ADP\_ON}$ is the on-threshold voltage $V_{TH\_ON}$. Alternatively, the adaptive delay voltage $V_{ADP\_ON}$ may be different from the on-threshold voltage $V_{TH\_ON}$. In some embodiments, the first and second state transitions used to determine the adaptive delay time $t_{ADP\_ON}$ may each be rising edges 760 of the pre-on trigger signal PRE_ON_TRG. In other embodiments, one or both of the first and/or second state transitions may be falling edges 764 of the pre-on trigger signal PRE_ON_TRG.

In some embodiments, the first and second state transitions used to determine the adaptive delay time $t_{ADP\_ON}$ may be the first and second rising edges 760 of the pre-on trigger signal PRE_ON_TRG within a given operating cycle of the resonant power converter 100. In other embodiments, the second state transition used to determine the adaptive delay time $t_{ADP\_ON}$ may correspond to a subsequent rising edge 760 after the second rising edge 760 within an operating cycle of the resonant power converter 100. For example, the second state transition may be the drain-source voltage $V_{SR1}$ dropping below the adaptive delay voltage $V_{ADP\_ON}$ a subsequent time after a first time of the drain-source voltage $V_{SR1}$ dropping below the adaptive delay voltage $V_{ADP\_ON}$ after the first state transition. In other words, the second state transition may be the $n^{th}$ rising edge 760 of the pre-on trigger signal PRE_ON_TRG, where n is an integer greater than two.

Figure 8:
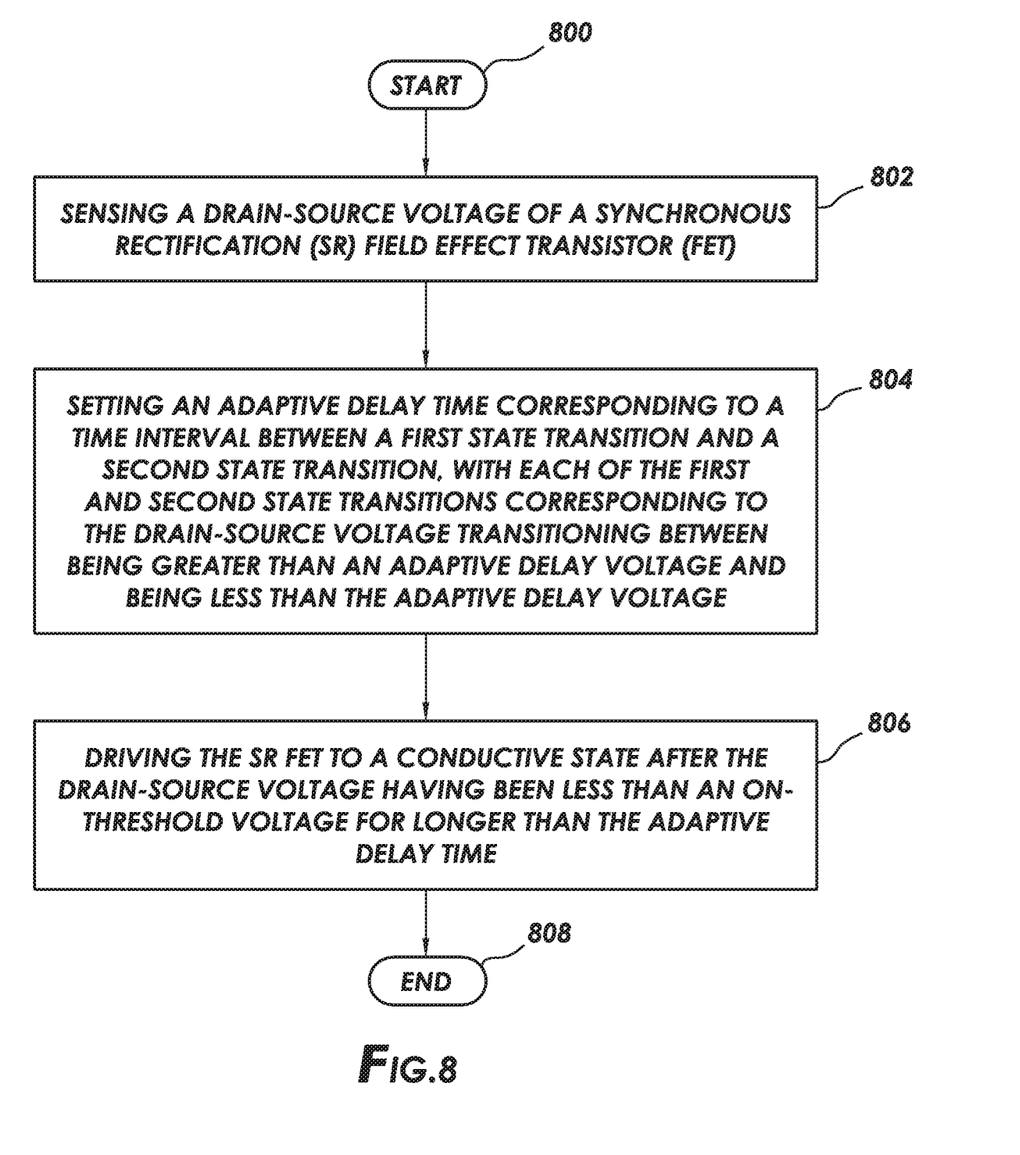
FIG. 8 shows method steps in accordance with at least some embodiments.

FIG. 8 shows a method of operating a rectification controller in accordance with at least some embodiments. In particular, the method starts (block 800) and comprises: sensing a drain-source voltage of a synchronous rectification (SR) field effect transistor (FET) (block 802). The method also includes setting an adaptive delay time corresponding to a time interval between a first state transition and a second state transition, with each of the first and second state transitions corresponding to the drain-source voltage transitioning between being greater than an adaptive delay voltage and being less than the adaptive delay voltage (step 804). The method concludes by driving the SR FET to a conductive state after the drain-source voltage having been less than an on-threshold voltage for longer than the adaptive delay time (step 806). Thereafter the method ends (block 808).

In some embodiments, the adaptive delay voltage is equal to the on-threshold voltage. For example, the on-threshold voltage may be used as the basis of the state transitions for setting the adaptive delay time. In some embodiments, the on-threshold voltage is between −0.5 V and 0.0 V.

In some embodiments, the method of operating a rectification controller also includes detecting an inversion current through an SR FET. An inversion current is defined as an electrical current flowing through the SR FET in an opposite direction from the normal, or preferred direction. Specifically, the method may include detecting an inversion current through the SR FET by: sensing the drain-source voltage of the SR FET being greater than an inversion reference voltage $V_{SRC\_INV}$ while driving the SR FET to the conductive state; and asserting a delay-enable signal in response to detecting an inversion current; de-asserting the delay-enable signal in response to a reset signal RST. In some embodiments, the reset signal RST is asserted by a load detection circuit in response to the resonant power converter 100 being in a heavy-load condition. In some embodiments, dedicated hardware, such as the current inversion detection block 340 discussed above, may perform one or more steps of detecting an inversion current.

In some embodiments, the method of operating a rectification controller includes delaying driving the SR FET to the conductive state for the adaptive delay time with the delay-enable signal DLY_EN asserted. In some embodiments, the method of operating a rectification controller also includes immediately driving the SR FET to the conductive state in response to the drain-source voltage being less than the on-threshold voltage with the delay-enable signal DLY_EN de-asserted. In some embodiments, the operation based on the delay-enable signal DLY_EN may be implemented using a turn-on controller 310. Specifically, choosing one of two or more different actions based on the delay-enable signal DLY_EN being asserted or de-asserted may include using an SR_ON logic block 570.

In some embodiments, each of the first and the second state transitions corresponds to the to the drain-source voltage dropping from a value greater than the adaptive delay voltage to a value less than the adaptive delay voltage. In other embodiments, one or both of the first and/or the second state transitions corresponds to the drain-source voltage rising from a value less than the adaptive delay voltage to a value greater than the adaptive delay voltage.

In some embodiments, the second state transition corresponds to the drain-source voltage dropping below the adaptive delay voltage a first time after the first state transition. In other embodiments, the second state transition corresponds to the drain-source voltage dropping below the adaptive delay voltage a subsequent time after a first time of the drain-source voltage dropping below the adaptive delay voltage after the first state transition. For example, the second state transition may be the $N^{th}$ rising edge of the pre-on trigger signal PRE_ON_TRG, where N is an integer number greater than two.

In some embodiments, the method of operating a rectification controller further includes: incrementing a value of a first counter by a periodic clock signal after the first state transition of the SR FET drain-source voltage; storing the value of the first counter memory in a storage memory in response to the second state transition of the SR FET drain-source voltage; incrementing a value of a second counter memory by the periodic clock signal with the drain-source voltage of the SR FET below the on-threshold voltage; and asserting an on-delay output in response to the value of the second counter memory being greater than the stored value in the storage memory.

In some embodiments, the method of operating a rectification controller further includes: maintaining driving the SR FET to the conductive state after the drain-source voltage having been less than the on-threshold voltage for longer than the adaptive delay time; and stopping driving the SR FET to the conductive state in response to the drain-source voltage being greater than an off-threshold voltage. For example, a first set-reset block 330 may be used to maintain a gate enable signal GATE_EN to thereby drive the SR FET to the conductive state until the first set-reset block 330 is reset by the drain-source voltage being greater than the off-threshold voltage.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a rectification controller, comprising:
    sensing a drain-source voltage of a synchronous rectification (SR) field effect transistor (FET), the sensing during a first period when the SR FET is non-conductive;
    setting an adaptive delay time corresponding to a time interval between a first state transition and a second state transition, with each of the first and second state transitions corresponding to the drain-source voltage transitioning between being greater than an adaptive delay voltage and being less than the adaptive delay voltage during the first period; and
    driving the SR FET to a conductive state after the drain-source voltage having been less than an on-threshold voltage for longer than the adaptive delay time.

2. The method of claim 1, wherein the adaptive delay voltage is equal to the on-threshold voltage.

3. The method of claim 1, wherein the on-threshold voltage is between −0.5 V and 0.0 V.

4. The method of claim 1, further comprising:
    detecting an inversion current by:
        sensing the drain-source voltage of the SR FET being greater than an inversion reference voltage while driving the SR FET to the conductive state;
    asserting a delay-enable signal in response to detecting the inversion current;
    de-asserting the delay-enable signal in response to a reset signal;
    delaying driving the SR FET to the conductive state for the adaptive delay time with the delay-enable signal asserted; and
    immediately driving the SR FET to the conductive state in response to the drain-source voltage being less than the on-threshold voltage with the delay-enable signal de-asserted.

5. The method of claim 1, wherein each of the first and the second state transitions corresponds to the drain-source voltage dropping from a value greater than the adaptive delay voltage to a value less than the adaptive delay voltage.

6. The method of claim 5, wherein the second state transition corresponds to the drain-source voltage dropping below the adaptive delay voltage a first time after the first state transition.

7. The method of claim 5, wherein the second state transition corresponds to the drain-source voltage dropping below the adaptive delay voltage a subsequent time after a first time of the drain-source voltage dropping below the adaptive delay voltage after the first state transition.

8. The method of claim 1, further comprising:
incrementing a value of a first counter memory by a periodic clock signal after the first state transition of the SR FET drain-source voltage;
storing the value of the first counter memory as a stored value in a storage memory in response to the second state transition of the SR FET drain-source voltage;
incrementing a value of a second counter memory by the periodic clock signal with the drain-source voltage of the SR FET below the on-threshold voltage; and
asserting an on-delay output in response to the value of the second counter memory being greater than the stored value in the storage memory.

9. The method of claim 1, further comprising:
maintaining driving the SR FET to the conductive state after the drain-source voltage having been less than the on-threshold voltage for longer than the adaptive delay time; and
stopping driving the SR FET to the conductive state in response to the drain-source voltage being greater than an off-threshold voltage.

10. A power converter comprising, comprising:
a primary side comprising:
    a primary winding of a transformer defining a first lead and a second lead;
    a parallel inductance connected between the first lead and the second lead of the primary winding of the transformer;
    a resonant inductor connected to the first lead of the primary winding of the transformer;
    a resonant capacitor; and
    a high-side field effect transistor (FET) configured to selectively conduct current from a power source to a switch node; and
a secondary side comprising:
    a secondary winding of the transformer defining a third lead and a fourth lead;
    a synchronous rectification (SR) field effect transistor (FET) including a drain coupled to one of the third lead or the fourth lead of the transformer and defining a drain-source voltage; and
    a rectification controller coupled to the SR FET and configured to drive the SR FET to a conductive state in response to the drain-source voltage being less than an on-threshold voltage for an adaptive delay time; and
    wherein the rectification controller is configured to adjust the adaptive delay time using a time differential between first and second state transitions of a comparison between the drain-source voltage during a first period when the SR FET is non-conductive and an adaptive delay voltage.

11. The power converter of claim 10, wherein each of the first and second state transitions of the comparison between the drain-source voltage and the adaptive delay voltage corresponds to the drain-source voltage dropping below the on-threshold voltage.

12. An integrated circuit rectification controller comprising:
a gate terminal, and a drain sense terminal having a drain-source voltage;
a turn-on controller including a drain sense input coupled to the drain sense terminal and an on-delay output coupled to the gate terminal, the turn-on controller configured to energize the on-delay output in response to the drain-source voltage being less than an on-threshold voltage for an adaptive delay time;
the turn-on controller including an adaptive delay comparator defining a comparator output and configured to assert the comparator output in response to the drain-source voltage being less than an adaptive delay voltage and to de-assert the comparator output in response to the drain-source voltage being greater than the adaptive delay voltage; and
wherein the adaptive delay time is set based on a time between a first state transition of the comparator output of the adaptive delay comparator and a second state transition of the comparator output of the adaptive delay comparator during a continuous period when the gate terminal is de-asserted.

13. The integrated circuit rectification controller of claim 12, wherein the adaptive delay voltage is the on-threshold voltage.

14. The integrated circuit rectification controller of claim 12, wherein each of the first and the second state transitions of the adaptive delay comparator corresponds to assertion of the comparator output of the adaptive delay comparator.

15. The integrated circuit rectification controller of claim 14, wherein the second state transition corresponds to the drain-source voltage dropping below the adaptive delay voltage a first time after the first state transition.

16. The integrated circuit rectification controller of claim 14, wherein the second state transition corresponds to the drain-source voltage dropping below the adaptive delay voltage a subsequent time after a first time of the drain-source voltage dropping below the adaptive delay voltage after the first state transition.

17. An integrated circuit rectification controller comprising:
a gate terminal, and a drain sense terminal having a drain-source voltage;
a turn-on controller including a drain sense input coupled to the drain sense terminal and an on-delay output coupled to the gate terminal, the turn-on controller configured to energize the on-delay output in response to the drain-source voltage being less than an on-threshold voltage for an adaptive delay time;
the turn-on controller including an adaptive delay comparator defining a comparator output and configured to assert the comparator output in response to the drain-source voltage being less than an adaptive delay voltage and to de-assert the comparator output in response to the drain-source voltage being greater than the adaptive delay voltage; and
wherein the adaptive delay time is set based on a time between a first state transition of the comparator output of the adaptive delay comparator and a second state transition of the comparator output of the adaptive delay comparator;
a pre-on pulse generator including an enable input coupled to the comparator output of the adaptive delay comparator, and a pulse output, the pre-on pulse generator configured to assert the pulse output for a pulse duration in response to the comparator output of the adaptive delay comparator being asserted;
an adaptive on-delay controller including a first input coupled to the pulse output of the pre-on pulse generator and a second input coupled to the comparator output of the adaptive delay comparator and an on-delay output, the adaptive on-delay controller comprising:
    a first counter having a first counter memory, the first counter configured to increment the first counter memory by a periodic clock signal after the first state transition of an SR FET drain-source voltage;

a storage register having a storage memory and configured to store the value of the first counter memory as a stored value in the storage memory in response to the second state transition of the SR FET drain-source voltage;

a second counter having a second counter memory, the second counter configured to increment the second counter memory by the periodic clock signal with the second input asserted; and a digital comparator configured to compare the value of the second counter memory with the stored value in the storage memory and to assert the on-delay output in response to the value of the second counter memory being greater than the stored value in the storage memory.

18. An integrated circuit rectification controller comprising:

a gate terminal, and a drain sense terminal having a drain-source voltage;

a turn-on controller including a drain sense input coupled to the drain sense terminal and an on-delay output coupled to the gate terminal, the turn-on controller configured to energize the on-delay output in response to the drain-source voltage being less than an on-threshold voltage for an adaptive delay time;

the turn-on controller including an adaptive delay comparator defining a comparator output and configured to assert the comparator output in response to the drain-source voltage being less than an adaptive delay voltage and to de-assert the comparator output in response to the drain-source voltage being greater than the adaptive delay voltage; and wherein the adaptive delay time is set based on a time between a first state transition of the comparator output of the adaptive delay comparator and a second state transition of the comparator output of the adaptive delay comparator;

a current inversion detection block including a first input coupled to the drain sense terminal of the integrated circuit rectification controller, and a second input coupled to the gate terminal of the integrated circuit rectification controller, and a delay-enable output, the current inversion detection block configured to assert the delay-enable output in response to the first input having a voltage greater than a predetermined inversion detect voltage while the gate terminal of the integrated circuit rectification controller is asserted.

19. An integrated circuit rectification controller comprising:

a gate terminal, and a drain sense terminal having a drain-source voltage;

a turn-on controller including a drain sense input coupled to the drain sense terminal and an on-delay output coupled to the gate terminal, the turn-on controller configured to energize the on-delay output in response to the drain-source voltage being less than an on-threshold voltage for an adaptive delay time;

the turn-on controller including an adaptive delay comparator defining a comparator output and configured to assert the comparator output in response to the drain-source voltage being less than an adaptive delay voltage and to de-assert the comparator output in response to the drain-source voltage being greater than the adaptive delay voltage; and wherein the adaptive delay time is set based on a time between a first state transition of the comparator output of the adaptive delay comparator and a second state transition of the comparator output of the adaptive delay comparator, the first and second state transitions both during a continuous period when the drain-source voltage is less than an on-threshold;

a set-reset block including a set input and a reset input and a latching output, the set-reset block configured to assert the latching output in response to assertion of the set input and to de-assert the latching output in response to assertion of the reset input; and an off-threshold comparator including a non-inverting input connected to the drain sense terminal, and an inverting input having an off-threshold voltage, the off-threshold comparator configured to assert the reset input of the set-reset block in response to the drain-source voltage being greater than the off-threshold voltage on the inverting input.

20. The integrated circuit rectification controller of claim 12, further comprising:

a gate driver defining a signal input and a driver output coupled to the gate terminal, the gate driver configured to energize the driver output with the signal input asserted and to de-energize the driver output with the signal input de-asserted.

* * * * *